UNITED STATES PATENT OFFICE 2,658,081

PREPARATION OF ETHER-ALCOHOLS

William S. Emerson and Raymond I. Longley, Jr., Dayton, Ohio, assignors to Monsanto Chemical Company, St. Louis, Mo., a corporation of Delaware No Drawing. Application December 16, 1950, Serial No. 201,231

7 Claims. (Cl. 260—615)

This invention relates to a novel method for the preparation of useful ether-alcohols. More specifically the invention is directed to a method of preparing alkoxypentanols by the hydrogenation of alkoxydihydropyrans.

The primary purpose of the invention is to provide a convenient and economical method of preparing certain alkoxypentanols. A further purpose is to convert alkoxydihydropyrans into useful ether-alcohols. Other purposes will be apparent from an inspection of the following description of the invention.

In copending application Serial No. 106,483, filed July 23, 1949, and now abandoned there are described and claimed various alkoxydihydropyrans and substitution products thereof which are useful in the preparation of alkoxypentanols in accordance with this invention. The copending application describes the reaction between vinyl or substituted vinyl ethers and $\alpha,\beta$-unsaturated aldehydes or ketones. The interreaction of these reagents forms alkoxydihydropyrans having the following structure:

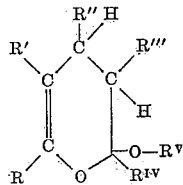

wherein $R^V$ is an alkyl radical having from one to four carbon atoms, and the radicals R, R', R'', R''', and $R^{IV}$, may be hydrogen or any alkyl radical of from one to four carbon atoms, such as methyl, ethyl, propyl, isopropyl, n-butyl and isobutyl.

In accordance with this invention it has been found that the alkoxydihydropyrans may be catalytically hydrogenated at temperatures of over 150° C. and under superatmospheric pressure to yield alkoxypentanols, substantially according to the scheme:

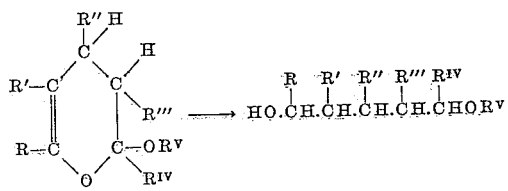

in which R, R', R'', R''', $R^{IV}$ and $R^V$ are as defined above.

The hydrogenation reaction is conducted by subjecting the alkoxydihydropyrans to gaseous hydrogen under pressure and in the presence of a suitable hydrogenation catalyst, for example, finely divided nickel, iron, molydenum, tungsten or cobalt or oxides of the same; palladium or its compounds; platinum black; copper chomite or other conventional hydrogenation catalysts. The hydrogenation reaction is preferably operated at elevated temperatures, for example above 175° C. and under some conditions as high as 300° C. The reactions are usually conducted until approximately the maximum amount of hydrogen has been absorbed, which may require from one to twenty-four hours, depending upon the conditions of reaction. The reaction is conducted in the substantial absence of water.

The hydrogenation reation is conducted in an autoclave or other closed vessel capable of withstanding high pressures and preferably adapted to maintain the contents in an agitated condition. Thus, stirred autoclaves or autoclaves with rocking or tumbling mechanisms, are useful. Pressures of at least 500 p. s. i., and preferably of from 1,000 to 3,000 p. s. i. are advantageously employed.

The following tabulation demonstrates the manner in which the alkoxy alcohols are obtained from various dihydropyran intermediates prepared from alkyl vinyl ethers or substituted vinyl ethers and $\alpha,\beta$-unsaturated aldehydes or ketones.

(A) Raw materials..... Methyl vinyl ketone; ethyl vinyl ether.
    Intermediate........ 2-ethoxy-6-methyl-3, 4-dihydro-1, 2-pyran.
    Ether-alcohols..... 6-ethoxy-2-hexanol.
(B) Raw materials..... Methyl vinyl ketone; n-butyl isopropenyl ether.
    Intermediate........ 2-n-butoxy-2,6-dimethyl-3,4-dihydro-1,2-pyran.
    Ether-alcohols..... 6-butoxy-6-methyl-2-hexanol.
(C) Raw materials..... Methacrolein; methyl isopropenyl ether.
    Intermediate........ 2-methoxy-2,5-dimethyl-3,4-dihydro-1,2-pyran.
    Ether-alcohols..... 5-methoxy-2-methylhexanol.
(D) Raw materials..... Ethyl isopropenyl ketone; propyl propenyl ether.
    Intermediate........ 2-propoxy-3,5-dimethyl-6-ethyl-3,4-dihydro-1,2-pyran.
    Ether-alcohols..... 7-propoxy-4,6-dimethyl-3-heptanol.
(E) Raw materials..... Vinyl methyl ether; methacrolein.
    Intermediate........ 2-methoxy-5-methyl-3,4-dihydro-1,2-pyran.
    Ether-alcohols..... 5-methoxy-2-methylpentanol.
(F) Raw materials..... Butenyl methyl ether; acrolein.
    Intermediate........ 2-methoxy-3-ethyl-3,4-dihydro-1,2-pyran.
    Ether-alcohols..... 5-methoxy-4-ethylpentanol.

Of the alkoxydihydropyrans having the above general formula, compounds prepared by the reaction of acrolein, methacrolein or crotonaldehyde with an alkyl vinyl ether, alkyl propenyl ether, or an alkyl butenyl ether are of special importance because of their ready availability. Such compounds have the general formula

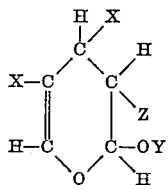

in which X is selected from the class consisting of hydrogen and the methyl radical, Z is selected from the class consisting of hydrogen and the methyl and ethyl radicals, and Y is an alkyl radical of from 1 to 4 carbon atoms. Compounds having the above general formula are readily hydrogenated by the present process to yield 5-alkoxypentanols.

Compounds within this class which are prepared from alkyl vinyl ethers and acrolein or β-substituted acroleins, e. g., crotonaldehyde, are 2-alkoxy-3,4-dihydro-1,2-pyrans or 4-alkyl-2-alkoxy-3,4-dihydro-1,2-pyrans which are very easily converted by the present process to give 5-alkoxypentanols or 3-alkyl-5-alkoxypentanols according to the scheme:

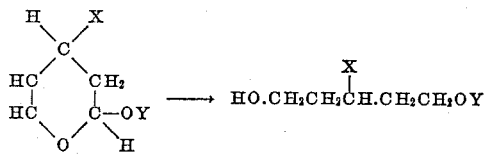

in which X is selected from the class consisting of hydrogen and alkyl radicals of from 1 to 4 carbon atoms and Y is an alkyl radical of from 1 to 4 carbon atoms.

Compounds prepared by the reaction of acrolein or of an alkyl vinyl ketone with an alkyl vinyl ether are the most easily obtainable dihydropyran ethers for use in the present process. Such compounds have the general formula

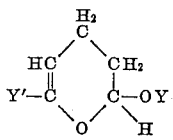

in which Y is an alkyl radical of from 1 to 4 carbon atoms and Y' is selected from the class consisting of hydrogen and an alkyl radical of from 1 to 4 carbon atoms. Compounds having the above general formula are readily hydrogenated according to this invention to yield 5-alkoxypentanols or alkoxy derivatives of long-chain secondary alcohols.

The invention is further illustrated, but not limited, by the following examples.

*Example 1*

*5-ethoxypentanol.*—A rocking autoclave containing 160 g. of 2-ethoxy-3,4-dihydro-1,2-pyran and 11 g. of copper chromite was charged with hydrogen to a pressure of 1000 lbs./sq. in. and heated rapidly to 200° C. The temperature was raised slowly to 250° C. at 1600 lbs./sq. in. and held there for four hours. Distillation of the filtered reaction mixture yielded 33 g. of ethanol and tetrahydropyran, B. P. 74–77° C.; 63 g. (39%) of crude 2-ethoxytetrahydropyran, B. P. 77°/760 mm.–50° C./20 mm., $n_D^{25}$ 1.4212; 4 g. of intermediate; and 21 g. (13%) of 5-ethoxypentanol, B. P. 94–97° C./14 mm. $n_D^{25}$ 1.4277.

*Example 2*

5-n-butoxypentanol was prepared similarly by the hydrogenation of 140 g. of 2-n-butoxy-3,4-dihydro-1,2-pyran in the presence of 6 g. of copper chromite. The mixture was heated rapidly to 255° C. at 1700 lbs./sq. in. and held there for three hours. The product comprised 19 g. of crude tetrahydropyran, B. P. 80–100° C.; 22 g. of crude butanol, B. P. 100° C./760 mm.–35° C./12 mm.; 19 g. of intermediate; 31 g. (22%) of 2-n-butoxytetrahydropyran, B. P. 70–72° C./12 mm., $n_D^{25}$ 1.4294; 6 g. of intermediate; and 27 g. (19%) of 5-n-butoxypentanol, B. P. 115–118° C./12 mm. (90–94° C./2 mm.), $n_D^{25}$ 1.4334.

We claim:

1. The method of preparing ether-alcohols having the general formula

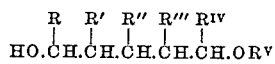

in which $R^V$ is an alkyl radical of from 1 to 4 carbon atoms and R, R', R'', R''', and $R^{IV}$ are selected from the class consisting of hydrogen and alkyl radicals of from 1 to 4 carbon atoms which comprises contacting with hydrogen, under anhydrous conditions, a dihydropyran compound having the general formula

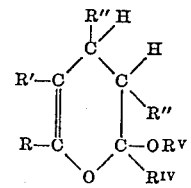

in which $R^V$ is an alkyl radical of from 1 to 4 carbon atoms and R, R', R'', R''', and $R^{IV}$ are selected from the class consisting of hydrogen and alkyl radicals of from 1 to 4 carbon atoms, in the presence of a hydrogenation catalyst, at a temperature of from 175° C. to 300° C., and at a pressure of at least 500 pounds per square inch.

2. The method of preparing ether-alcohols having the general formula

in which Y is an alkyl radical of from 1 to 4 carbon atoms, X is selected from the class consisting of hydrogen and the methyl radical and Z is selected from the class consisting of hydrogen and the methyl and ethyl radicals, which comprises contacting with hydrogen under anhydrous conditions, a dihydropyran compound having the general formula

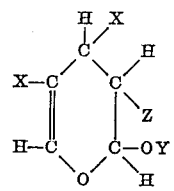

in which Y is an alkyl radical of from 1 to 4 carbon atoms, X is selected from the class consisting of hydrogen and the methyl radical and Z is selected from the class consisting of hydrogen and the methyl and ethyl radicals, in the presence of a hydrogenation catalyst at a temperature of from 175° C. to 300° C. and at a pressure of at least 500 pounds per square inch.

3. The method of preparing ether-alcohols having the general formula

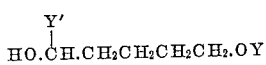

in which Y is an alkyl radical of from 1 to 4 carbon atoms and Y' is selected from the class consisting of hydrogen and alkyl radicals of from 1 to 4 carbon atoms which comprises contacting with hydrogen, under anhydrous conditions, a dihydropyran compound having the general formula

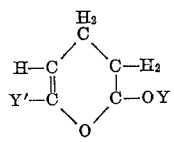

in which Y is an alkyl radical of from 1 to 4 carbon atoms and Y' is selected from the class consisting of hydrogen and alkyl radicals of from 1 to 4 carbon atoms, in the presence of a hydrogenation catalyst, at a temperature of from 175° C. to 300° C., and at a pressure of at least 500 pounds per square inch.

4. The method of preparing 5-alkoxypentanols in which the alkoxy radical has from 1 to 4 carbon atoms which comprises contacting with hydrogen a 2-alkoxy-3,4-dihydro-1,2-pyran in which the alkoxy radical has from 1 to 4 carbon atoms, in the presence of a hydrogenation catalyst, at a temperature of from 175° C. to 300° C., at a pressure of at least 500 pounds per square inch, and under anhydrous conditions.

5. The method of preparing 5-alkoxypentanols in which the alkoxy radical has from 1 to 4 carbon atoms which comprises contacting with hydrogen a 2-alkoxy-3,4-dihydro-1,2-pyran in which the alkoxy radical has from 1 to 4 carbon atoms, in the presence of copper chromite, at a temperature of from 175° C. to 300° C., at a pressure of at least 500 pounds per square inch, and under anhydrous conditions.

6. The method of preparing 5-ethoxypentanol which comprises contacting 2-ethoxy-3,4-dihydro-1,2-pyran with hydrogen in the presence of copper chromite at a temperature of from 175° C. to 300° C., and at a pressure of at least 500 pounds per square inch, and under anhydrous conditions.

7. The method of preparing 5-n-butoxypentanol which comprises contacting 2-n-butoxy-3,4-dihydro-1,2-pyran with hydrogen in the presence of copper chromite at a temperature of from 175° C. to 300° C., and at a pressure of at least 500 pounds per square inch, and under anhydrous conditions.

WILLIAM S. EMERSON.
RAYMOND I. LONGLEY, Jr.

References Cited in the file of this patent

UNITED STATES PATENTS

| Number | Country | Date |
|---|---|---|
| 2,440,929 | MacKay et al. | May 4, 1948 |
| 2,546,019 | Smith | Mar. 20, 1951 |
| 2,610,193 | Whetstone | Sept. 9, 1952 |

OTHER REFERENCES

Woods et al.: Jour. Am. Chem. Soc., vol. 68, pages 2483–5 (1946).

Wojcik: Industrial and Engineering Chemistry, February 1948, pages 210–216.